United States Patent [19]

Heidlas et al.

[11] Patent Number: 5,466,842
[45] Date of Patent: Nov. 14, 1995

[54] PROCESS FOR THE ISOLATION OF LIPID FRACTIONS FROM EGG PRODUCTS IN POWDER FORM

[75] Inventors: Jürgen Heidlas, Trostberg; Jan Cully, Garching; Franz Michlbauer, Kirchweidach; Heinz-Rüdiger Vollbrecht, Altenmarkt, all of Germany

[73] Assignee: SKW Trostberg Aktiengesellschaft, Trostberg, Germany

[21] Appl. No.: 213,410

[22] Filed: Mar. 15, 1994

[30] Foreign Application Priority Data

Mar. 15, 1993 [DE] Germany .................. 43 07 980.6

[51] Int. Cl.⁶ ..................................... C07F 9/02
[52] U.S. Cl. ................ 554/83; 554/206; 426/605; 426/613; 426/614
[58] Field of Search ............ 554/83, 206; 426/605, 426/613, 614

[56] References Cited

U.S. PATENT DOCUMENTS 5,024,846  6/1991  McLachlan et al. ............... 426/312

FOREIGN PATENT DOCUMENTS 0531104  3/1993  European Pat. Off. .
8702697  5/1987  WIPO .

OTHER PUBLICATIONS

Abstract—JP6058934 (Taiyo Kagaku KK) Mar. 4, 1994.

*Primary Examiner*—José G. Dees
*Assistant Examiner*—Deborah D. Carr
*Attorney, Agent, or Firm*—Felfe & Lynch

[57] ABSTRACT

A process for the isolation of lipid fractions from egg products in powder form with a content of phospholipids is described in which the egg product is extracted a) with liquid propane at a pressure of $\leq 200$ bar and a temperature of $\leq 70°$ C. and b) an entraining agent consisting of an aliphatic alcohol with 1 to 4 C atoms.

In this way it is possible to produce lipid fractions with good sensory properties whose content of phospholipids is at least 20% by weight.

10 Claims, No Drawings

PROCESS FOR THE ISOLATION OF LIPID FRACTIONS FROM EGG PRODUCTS IN POWDER FORM

DESCRIPTION

The present invention concerns a process for the isolation of lipid fractions from egg products in powder form with a high content of phospholipids.

Egg-based lipid fractions are used in many different ways in the food sector due to their physiological and functional properties (in particular in the production of dietetic products) as well as in the pharmaceutical and chemical industry. Those lipid fractions that have a high content of phospholipids (lecithin) are of particular interest in nutritional physiology since valuable polyunsaturated fatty acids, above all arachidonic acid, are present in these fractions.

The isolation of these lipid fractions from egg products is carried out according to previously known processes (cf. for example EP-A 74251) by extraction with organic solvents such as e.g. chloroform or acetone. Apart from the fact that the extraction has to be carried out in several steps in any case, the solvents used have the additional disadvantage that the respective solvent residues are harmful to health. In addition they can cause changes in the taste (in particular in the case of acetone) of such products and their sensory quality is considerably impaired.

The object of the present invention is therefore to develop a process for the isolation of lipid fractions in powder form from egg products which does not have the said disadvantages of the prior art but allows the isolation of lipid fractions with a relatively high content of phospholipids and good sensory properties in a technically uncomplicated process.

This object is achieved according to the invention by extracting the egg product a) with liquid propane at a pressure of $\leq 200$ bar and a temperature of $\leq 70°$ C. and b) an entraining agent consisting of an aliphatic alcohol with 1 to 4 C atoms.

It has surprisingly turned out that lipid fractions with a phospholipid content of more than 20% by weight and good sensory properties can be produced in a mild manner with the aid of this solvent mixture. Egg-based products in powder form such as e.g. egg yolk powder or whole egg powder or products which contain these substances are used for the process according to the invention which have a content of phospholipids of preferably at least 5% by weight which makes the processing worthwhile. An essential feature of the process according to the invention is that the extraction is carried out with propane in liquid form at a pressure of $\leq 200$ bar and a temperature of $\leq 70°$ C. in the presence of an entraining agent which consists of an aliphatic alcohol with 1 to 4 C atoms. The lower limit for pressure and temperature results from the requirement that propane must be used as a liquid for each of the temperature and pressure conditions selected from the constitution diagram of propane.

According to the present invention it is ensured that fats as well as phospholipids (in particular lecithin) are dissolved in the extraction medium. Due to the sensitive properties of the other constituents of egg products and proteins in particular, the extraction is preferably carried out in a pressure range of 10 to 100 bar and at an extraction temperature between 20° and 60° C. In this way a denaturation of the proteins in the extraction residue is avoided so that use can also be made of this protein-rich egg fraction.

In the process according to the invention, short-chained aliphatic alcohols with 1 to 4 C atoms and namely methanol, ethanol, propanol, isopropanol, butanol, isobutanol or tertiary butanol are used as an entraining agent which is preferably used in an amount of 1 to 20% by weight in relation to the amount of propane gas. Ethanol is preferably used for toxicological reasons.

The amount of propane gas used can be varied within wide limits and essentially depends on the amount of the content of fats or phospholipids to be removed. As a rule 1 to 30 kg per kg starting material is adequate to achieve a satisfactory yield of the desired lipid fraction. Within the scope of the present invention it is also possible to use the propane in a mixture with butane. The addition can be up to 45% by weight.

Following the extraction, the fats and phospholipids dissolved in the extraction medium can then be separated from the propane/alcohol mixture by evaporation and/or reduction in pressure.

A further possibility for separating extracts from the extraction medium is to bring propane near to the critical constitution parameter ($p_K=42$ bar, $T_K=96°$ C.) which results in the desired separation. This variant of the process is therefore particularly advantageous because no energy is necessary for the phase transition of the solvent (evaporation or condensation energy).

According to a preferred embodiment a re-extraction with propane (without entraining agent) is carried out after the extraction with entraining agents to remove residual entraining agents from the extract and the extract residue which is preferably carried out in the same pressure and temperature range as the extraction. The complete separation of the entraining agent from the propane gas can be carried out according to conventional methods and using the known devices such as e.g. drop separators or appropriate filter systems so that the propane gas is again available for the extraction of egg products after liquefaction and/or compression. In this way a small amount of propane gas can be circulated continuously whereby the economic efficiency of the method is considerably increased.

Using the process according to the invention it is possible to produce lipid fractions from egg products in powder form with good sensory properties whose content of phospholipids is at least 20% by weight.

The following examples are intended to elucidate the invention in more detail.

EXAMPLE 1

5 kg compressed propane to which 4% by weight ethanol is fed as an entraining agent, is passed through 1000 g egg yolk powder (total fat: 60% by weight; fat: 45% by weight; phospholipids: 15% by weight) within 30 minutes at 20 bar and 45° C. in a 4 l pressure autoclave. For the re-extraction of the residue it is subsequently extracted with a further 15 kg propane without entraining agent for 90 minutes in order to remove residual entraining agent. The process is carried out in a circulation in which the extract separation is achieved by evaporation of the propane in a separator. After the complete removal of the entraining agent from the extract, 540 g extract is weighed and analysed: fat (triglycerides): 78% by weight, phospholipids: 20% by weight.

EXAMPLE 2

5 kg compressed propane to which 10% by weight ethanol is fed as an entraining agent, is passed through 1000 g egg yolk powder (total fat: 60% by weight; fat: 45% by weight; phospholipids: 15% by weight) within 30 minutes at 100 bar and 50° C. in a 4 l pressure autoclave. It is subsequently extracted for 90 minutes with a further 15 kg propane without entraining agent. The process is carried out in a circulation in which the extract separation is achieved by evaporation of the propane in a separator. After the complete removal of the entraining agent from the extract, 580 g extract is weighed and analysed: fat (triglycerides): 75% by weight, phospholipids: 23% by weight.

We claim:

1. A method for isolating a lipid fraction of triglycerides and phospholipids from an egg product in powdered form consisting essentially of:

(a) exposing said egg product to an extraction mixture of an aliphatic alcohol having from 1 to 4 carbon atoms and liquid propane at a pressure of $\leq 200$ bar and a temperature of $\leq 70°$ C. to obtain an extraction residue of said egg product and an extracted mixture containing said aliphatic alcohol, liquid propane, and lipid fraction; and (b) isolating said lipid fraction from said extracted mixture obtained in step (a).

2. Process of claim 1, wherein the pressure of said extraction mixture is from 10 to 100 bar.

3. Process of claim 1, wherein the temperature of said extraction mixture is from 20° to 60° C.

4. Process of claim 1, wherein said aliphatic alcohol of step (a) comprises from 1 to 20% by weight compared to the weight of said liquid propane of step (a).

5. Process of claim 1, wherein said aliphatic alcohol is ethanol.

6. Process of claim 1, wherein from 1 to 30 kg propane is used per kilogram of said egg product in powdered form.

7. Process of claim 1, wherein said lipid fraction is isolated from said extracted mixture by evaporating said liquid propane and said aliphatic alcohol from said extracted mixture or reducing the pressure of said extracted mixture.

8. Process of claim 1, further consisting essentially of exposing said extraction residue and extracted mixture of step (a) to propane to remove residual aliphatic alcohol from said extraction residue and extracted mixture.

9. Process of claim 8, wherein said removal of residual aliphatic alcohol from said extraction residue and said extracted mixture is carried out under the same conditions as those recited in step (a).

10. Process of claim 1, wherein said extraction mixture of step (a) further comprises butane.

* * * * *

UNITED STATES PATENT AND TRADEMARK OFFICE
CERTIFICATE OF CORRECTION

PATENT NO. : 5,466,842
DATED : Nov. 14, 1995
INVENTOR(S) : Heidlas, et al.

It is certified that error appears in the above-identified patent and that said Letters Patent is hereby corrected as shown below:

column 2, line 11, change "rule" to -- rule, --.

Signed and Sealed this

Twenty-fifth Day of July, 2000

Attest:

Q. TODD DICKINSON

*Attesting Officer*  *Director of Patents and Trademarks*